Nov. 7, 1967  G. B. BUSH ETAL  3,351,943
CORRELATION DOPPLER SYSTEM
Filed Oct. 13, 1965  3 Sheets-Sheet 1

INVENTORS
GEORGE B. BUSH
LARRY L. WARNKE

BY Claude Funkhouser
ATTORNEY
Leonard L. Lourie
AGENT

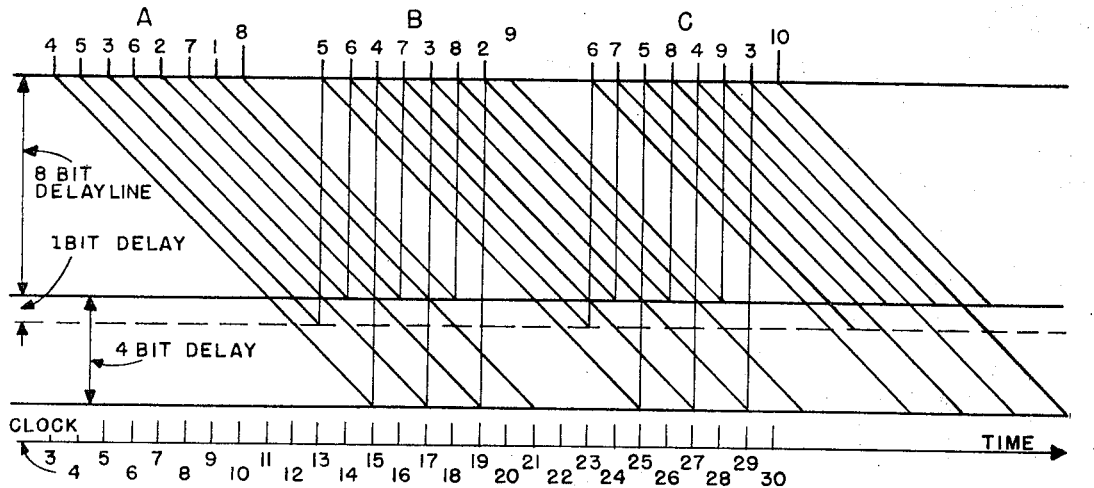
FIG. 5
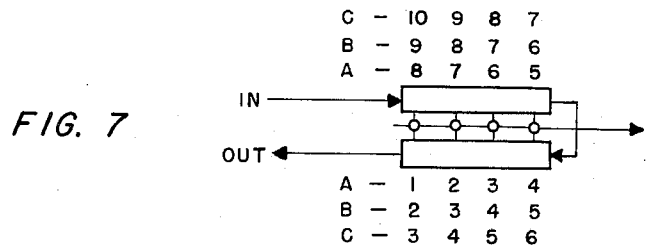
FIG. 7
FIG. 6
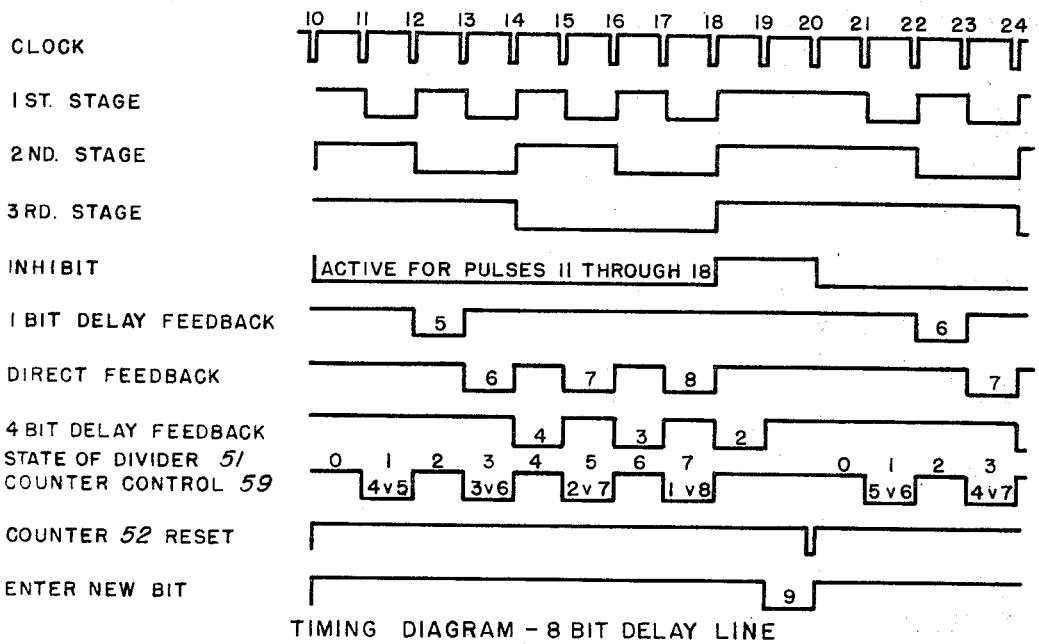
TIMING DIAGRAM – 8 BIT DELAY LINE 3,351,943
CORRELATION DOPPLER SYSTEM
George B. Bush, Clarksville, and Larry L. Warnke, Laurel, Md., assignors to the United States of America as represented by the Secretary of the Navy
Filed Oct. 13, 1965, Ser. No. 495,738
7 Claims. (343—112)

ABSTRACT OF THE DISCLOSURE

A satellite correlation Doppler system to determine the closest approach of a moving body to an observer station. A signal from the moving body is beat against a reference signal at the observer station to produce a Doppler signal. Samples of the Doppler are taken sequentially and a comparison made between the older and newer samples to determine when there is a symmetry of polarity between the samples. Symmetry for a whole sampling period would indicate that the moving body is at its closest position to the observer station.

---

The present invention relates generally to a correlation Doppler system for determining the time at which a Doppler signal has a certain frequency and more in particular a satellite correlation Doppler system and method for determining the time of intercept between a Doppler frequency of a transmitted radio frequency signal of a moving satellite and a fixed reference signal at a receiving position.

An object of the present invention is to provide a correlation Doppler system which determines the closest approach between a moving satellite and an observer.

Another object of the present invention is to provide a correlation Doppler system for determining the time of intercept between a Doppler frequency signal of a moving satellite and a fixed reference signal at a receiving position.

A further object of the present invention is to provide a quick and easy method for determining the time at which a Doppler signal has a particular frequency.

Another object of the present invention is to provide a digital computer for sampling information and for correlating and comparing the oldest sampled information with the newest.

Other objects, advantages and novel features of the invention will become apparent from the following detailed description of the invention when considered in conjunction with the accompanying drawings wherein:

FIG. 5 is a graphical representation of the sequential data for a delay line useful in explaining the operation of the arrangement of FIG. 4;

FIG. 6 is a timing diagram useful in explaining the arrangement of a digital system of FIG. 4; and FIG. 7 shows an order diagram for a delay line of an analog correlation Doppler system.

The present invention of a correlation Doppler detector can be used to gather data for the determinations made for geodesy, selenodesy or the size and shape of any body or planet in the solar system. The system provides information for navigational fixes by measuring the Doppler shift in radio transmissions from a near-earth satellite. In any satellite navigation system, there must be a certain number of satellites in suitable orbits to provide the required information for determining the navigational position of the various users of the system such as ships, airplanes, submarines, space crafts, and other satellites. In any system using satellites, the information about the ephemeris of the various satellites are sent to the users so that they can make the required computations to determine their position. The correlation system of the present invention would be furnished each of the users so that the time of the closest approach of a satellite to the user can be determined. With this current information of the satellite, the user can correct the predicted ephemeris of the satellite and determine his actual position with about ten minutes of calculations.

Figure 1:
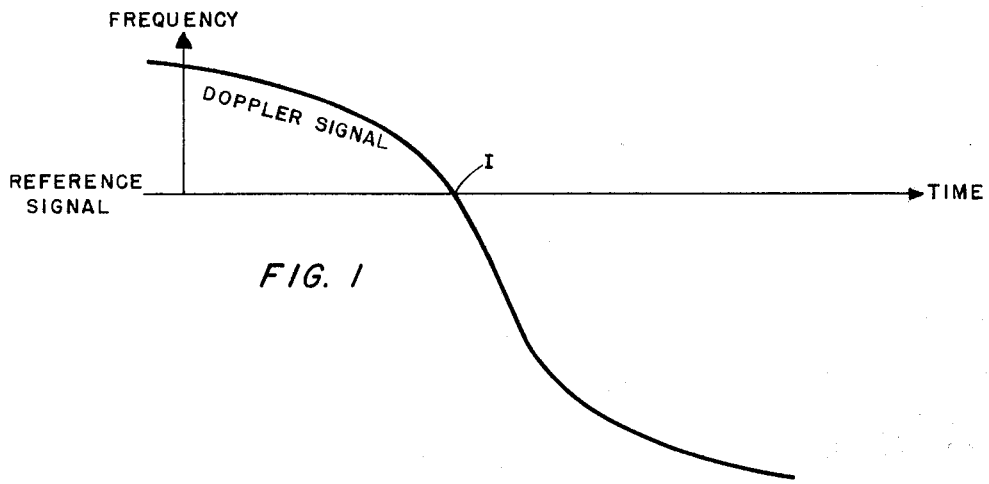
FIG. 1 shows a plot on a frequency versus time graph of a typical Doppler characteristic of a signal together with a constant frequency reference signal.

In order to determine the closest approach in time of the satellite, the observer has to determine the time at which a Doppler shift of the radio frequency signal from the satellite has a particular frequency. A typical Doppler signal of a transmitted signal and a standard reference signal are plotted on a graph of frequency versus time as shown in FIG. 1. The required data for the observer is the time of intercept, I, between these two curves. If the user has the ephemeris of the satellite moving in a nominally polar orbit, knows the frequency of the satellite transmitted signal, and sets the frequency of the referece signal to that of the satellite transmitted signal, then the time of intercept on the Doppler curve would enable the observer to calculate his latitude to a first order approximation. If two other points on the Doppler curve on either side of the intercept point are determined by changing the frequency of the reference signal a known amount from the actual transmitted satellite signal, then the observer can determine the slope of the Doppler curve and by calculations determine his longitudinal position to a first order approximation. If a third point on the Doppler curve is obtained by changing the frequency of the reference signal, then the frequency error of the satellite signal can be determined.

If one is to look at the narrow region around the intercept point, I, it can be assumed that the slope of the Doppler signal is constant for a first approximation. If the received ratio frequency signal having a Doppler shift is mixed with a standard reference signal at the position of the user, there will be a resulting beat frequency signal as illustrated by waveform 35 of FIG. 2. An analysis of the beat frequency waveform 35 will show that it has nearly perfect symmetry around the central time of the intercept point, I, independent of the slope of the Doppler curve. The symmetry in time of the beat frequency signal 35 is the basis for the correlation detection method and system of the present invention.

Figure 3:
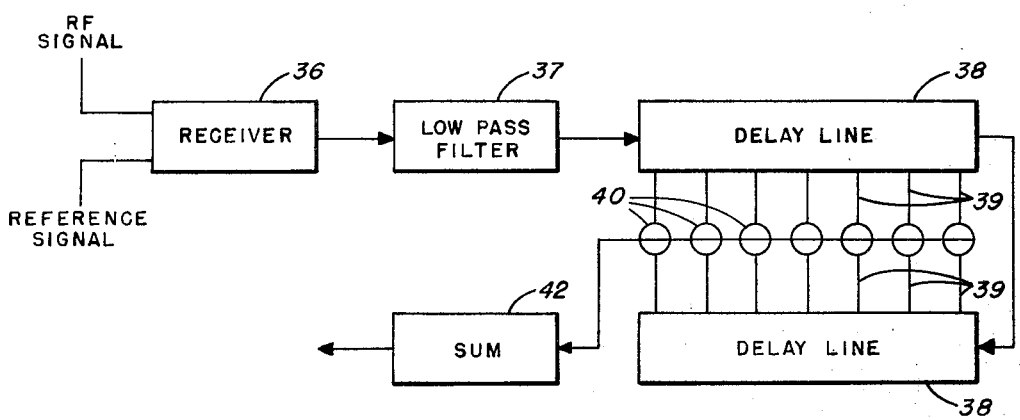
FIGURE 3 is a block diagram of an analog correlation Doppler system.

Referring now to FIG. 3 of the drawings, the correlation detection system using analog means is shown. The satellite radio frequency signal is mixed with a reference signal at the user's station in receiver 36. Since the satellite is moving relative to the user or observer, the transmitted satellite signal will exhibit the Doppler shift as the satellite approaches and moves away from the observer. The varying frequency difference between the received signal and the fixed signal will be the output signal or beat signal 35 of the receiver. The beat signal 35 from the receiver is fed to a low pass filter 37 which limits the beat signal to a particular frequency band.

The band limited signal from low pass filter 37 enters delay line 38. Delay line 38 is arranged so that the taps 39 on the first half of the delay line are matched with the taps 39 on the second half of the delay line which would be like a delay line bent in half and folded back on itself. The opposing taps 39 on the delay line would feed various delay signals of the beat frequency signal to linear product multipliers 40. The output of multipliers 40 would be integrated in summer 42. If the tap interval is significantly less than the period of the highest frequency component of the signal then this method approaches a perfect correlation detection of the time-symmetric signal state about the intercept point, I. The symmetric signal state will occur only when the beat frequency signal corresponding to the time of intercept has reached the midpoint of the delay line. At this time each and every multiplier 40 has inputs of the same magnitude and polarity. The products are all positive and sum to a peak signal output. At all other times, the signal will be much less. The time when the signal output from summer 42 is the greatest or at a peak determines the time of intercept between the Doppler signal and the fixed reference signal. The time of the peak would be a predetermined time after the time of intercept since information before and after the time of intercept is being compared or correlated. This time of intercept is the same as the time of closest approach of a moving satellite to observer if the reference signal has the same frequency of the transmitted satellite signal. Likewise, the time of a geometric constraint analogous to closest approach of two moving satellites could be determined in a similar manner if the apparatus of the present invention is on one of the satellites.

Figure 4:
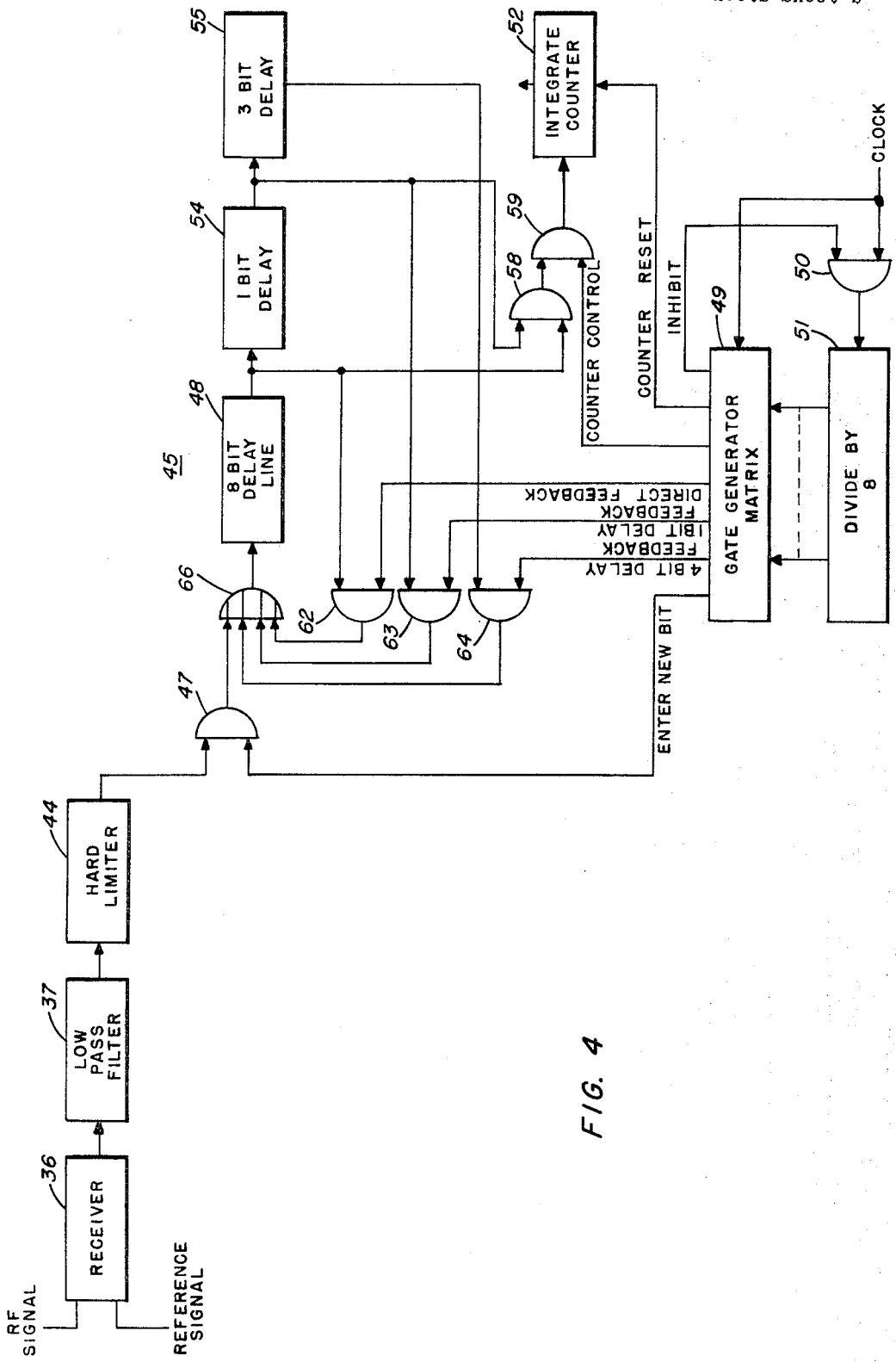
FIG. 4 is a block diagram illustrating one form of a digital correlation Doppler system.

Instead of the analog system of FIG. 3 a digital sampling means using a 2048 microseconds delay line operating with a megacycle clock was devised. For ease of explanation a digital Doppler system using an 8 bit delay line is illustrated in FIG. 4. In this system a radio frequency transmitted satellite signal is mixed with a reference signal in receiver 36 which feeds a beat frequency signal to a low pass filter 37 and then to a hard limiter 44. The limiter 44 squares off or limits the amplitude of the beat frequency signal to certain positive and negative values as illustrated by waveform 46 of FIG. 2. This signal 46 from the hard limiter is fed to the sampling digital computer 45 which would sample the signal 46 approximately once every cycle of the delay line. Since the computer 45 uses conventional computer elements, And and Or circuits, the method of determining the time at which the Doppler signal has a particular frequency by sampling at And gate 47 is best explained by referring to FIGS. 5, 6, and 7.

The order diagram of FIG. 7 represents a delay line doubled back on itself with common taps for each half of the line. The numbers indicate the order in which the data bits are entered into a delay line, the smaller number indicating older bits timewise and the larger numbers the more recent bits. A, B and C in FIG. 7 respresent each succeeding cycle or sample period of the delay line. On each sample period an old bit is removed and a new bit is inserted for example: for cycle A the oldest bit would be 1 and the newest bit 8. FIG. 7 illustrates the bits in the delay line to be compared are minor image bits for example: for cycle A bits 1 and 8, 2 and 7, 3 and 6, and 4 and 5 and for cycle B bits 2 and 9, 3 and 8, 4 and 7, and 5 and 6.

The computing circuit 45 of FIG. 4 has the method of inserting the various sampled bits into the 8 bit delay line 48 so that the position of the bits in the delay line are remembered. The basic arrangement of the bits in the delay line is such that every other bit would have its time symmetrical mirrored image bit immediately following it in position. With a delay of one bit, a comparison can be made between any bit and its mirror image bit in the delay line. The computer part 45 of the digital correlation system of FIG. 4 includes an 8 bit delay line 48 controlled by a gate generator matrix 49 which is governed or controlled by clock 50 through counter or divider 51. The clock pulses are divided by eight in counter 51 which has 3 stages of multivibrators establishing the "set" gates as noted in FIG. 6 for the 1st, 2nd, and 3rd stages. FIG. 6 shows the waveforms from the "set" side of the multivibrators of divider 51. These waveforms on the up level define a zero and on the down level define a one.

The gate generator matrix 49 usually would have a series of And gates which are activated by various states of the divide by eight counter 51, and are sampled by the clock 50. The output of these gates insures that the various feedback gates or data input gates are open at the right time. The integration counter 52 which counts the number of like mirrored bits for anyone cycle would be activated and reset by the proper gate from the gate generator matrix. Since there is a necessity for a two bit delay in the counting and the shifting process so that all bits are at least delayed in subsequent cycles in the proper manner, an inhibit signal is selected by the gate generator matrix to hold the divide by eight counter 51 in the zero state for two clock pulses. In the system all gates, as shown by FIG. 6, operate on the trailing edge of the clock pulse. The clock pulses to the divider 51 are inhibited on the ninth and tenth pulse for any cycle. For example, the clock would be inhibited on clock pulses 19 and 20 for cycle B and pulses 29 and 30 for cycle C. The integration counter 52 is reset after the introduction of any new bit on each cycle of the delay line.

The computer 45 has a one bit delay unit 54 and 3 bit delay unit 55 so that at the proper times any bit may be delayed one clock pulse or four clock pulses for the proper reinsertion into the delay line 48. The exclusive Or gate 58 will make comparisons during each cycle between a bit at the end of the delay line and the preceding bit which has been delayed one pulse through unit 54. The output of gate 58 will only indicate that the compared bits have the same polarity either positive or negative. Counter control 59 is governed by a signal from gate generator matrix as shown in FIGS. 4 and 6 and operates on every even clock pulse of a cycle to select the comparison made between mirrored image bits and to add to the integrator 52 a count when compared bits have the same polarity.

To comprehend the operation of the invention, reference to FIG. 5 is now made where time is measured in the positive direction left to right along the horizontal axis and the clock pulses are numbered consecutively. The bit numbers for A, B and C cycles are at the top of the diagram corresponding to the arrangement in and the insertion time into the 8 bit delay line 48 of FIG. 4. From FIG. 5 cycle A shows the condition of the delay after 8 bits have been loaded and shifted in the delay line 48. The clock pulses have been numbered arbitrarily so that the sequence of inserting the bits to and shifting them for the delay line can be explained in conjunction with FIGS. 5 and 6 for the digital correlation system of FIG. 4. In the feedback gates of FIG. 6, the bit that is fed back to the delay line is indicated within the gate.

Starting with clock pulse 10 as shown in FIG. 5, a new bit 8 is added to the delay line at the end of cycle A. On clock pulse 11, bit 4 is at the end of the delay line, is fed to the one bit delay unit 54, then to the three bit delay unit 55 for a total of a four pulse delay and will be reinserted at the beginning of the line on clock pulse 15 as indicated in the 4 bit delay feedback of FIG. 6. On clock pulse 12, bit 5 is at the end of the delay line, bit 4 has been delayed one pulse in one bit delay unit 54 and is now ready for comparison with bit number 5 as indicated in the counter control gate of FIG. 6. The exclusive Or gate 58 makes the comparison during a cycle. From FIG. 5, the counting starts on clock pulse 11 for cycle A and pulse 21 for cycle B. The comparisons between the mirror image bits are selected on odd counts of a cycle of divider 51. For cycle A, the selection by counter control 59 would be on states 1, 3, 5, and 7 of divider 51 or clock pulses 12, 14, 16 and 18, as shown in FIG. 6. At clock pulse 13, bit 5 which had been delayed one clock pulse in the one bit delay unit 54 is now reinserted into the beginning of the delay line through one bit feedback gate 63 to Or gate 66 as indicated by 1 bit delay feedback of FIG. 6. On clock pulse 14, comparison is made between bits 3 and 6 indicated by counter control gate of FIG. 6. At this time, bit 3 which had been delayed one pulse through unit 54 is compared with bit 6 at the end of the delay line. Bit 6 is now being reinsertd into the beginning of the delay line as shown by the direct feedback signal of FIG. 6. Also direct feedback of bits 7 and 8 is indicated on subsequent clock pulses. At clock pulse 15, bit number 4 has been delayed four pulses and is being reinserted back into the delay line, the timing of the reinsertion is governed by the 4 bit delay feedback of FIG. 6. At the same time, bit number 2 is leaving the delay line and will be delayed four pulses of clock time to be reinserted back into the delay line at clock pulse 19. On clock pulse 16, bit 2 which has been delayed one clock pulse in unit 54 is compared with bit number 7 which is at the end of the delay line and which is now being reinserted back to the beginning of delay line through gate 62 and Or gate 66.

This process of shifting and moving the various bits in a delay line for each cycle can be used for any type of delay line with any even number of bits. A new bit is inserted into the delay line at the end of each cycle. On the next cycle, this bit is moved in position two slots or pulse counts within a cycle towards the beginning of the pulse count for that cycle and so on for each succeeding cycle until the bit reaches the position for the fourth count of a cycle or the second slot of the delay line. When the bit occupies the second slot in the line, such as bit number 5 on clock pulse 4, it has reached a so-called image point and is reinserted back in the line on clock pulse 13 after a delay of one clock pulse to propagate back up the line. To propagate the bit back up the line again occupying every other position, a four bit or pulse delay is required.

For an 8 bit delay line, the last comparison for cycle A is made on clock pulse 18 between bit 1 and bit 8, bit 8 being reinserted directly back in the line. On clock pulses 19 and 20 an inhibited gate signal as shown by FIGS. 4 and 6 is fed to the clock to stop the counting by eight so that the counter control does not count for two clock pulses and allows for bit 2 to be reinserted back in the delay line after a four pulse count delay and for new bit 9 to be introduced for the first time into the delay line on clock 20 since bit 1 has left the delay line. The selection of a new bit is governed by the new bit signal Or gate sent to And gate 47.

By this sampling method, the integrator counter 52 will count the number of comparisons selected by counter control gate 59. The greatest number of comparisons will indicate a particular time or a particular cycle of the delay line that the beat frequency signal is symmetrical about the midpoint of that particular cycle. The time of the greatest number of comparisons will exceed the time of intercept. This difference in time, which is called the integration time, can be determined by taking half the number bits in the delay line multiplied by the sampling interval. The sampling interval is the length of the delay line plus two clock pulses.

Figure 2:
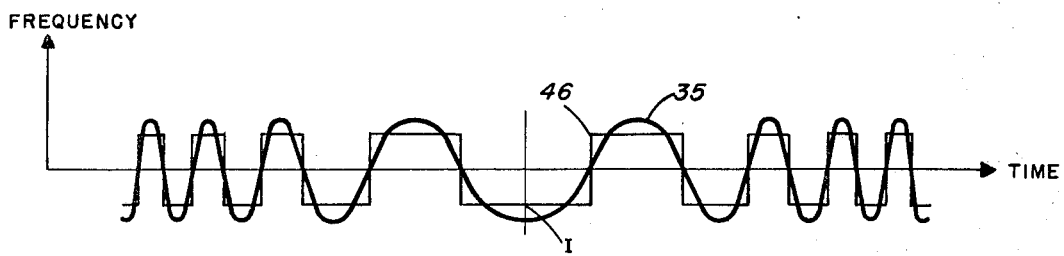
FIG. 2 shows a plot on a frequency versus time graph of the resulting beat frequency signal between the plotted signals of FIG. 1.

The above process and technique although presented for an 8 bit delay line works equally well for any length of a delay line which is an even number of bits. A 2048 microseconds line with a 1 megacycle clock was used in actual implementation of this invention. The output of limiter as shown by waveform 46 of FIG. 2 is sampled once on each cycle of the delay line which is about 2 milliseconds. Since a bit must occupy each position of the line for each cycle, the effective integration time is approximately 2 seconds. However, this integration time may be varied by inhibiting the integration counter during a portion of the 2 millisecond cycle of the delay line. Essentially it is known that all the digital data in the delay line consists of 1024 bits of information on each side of the mirror image point, each bit being separated by 2 milliseconds in time. This gives a total of 4 seconds worth of data—2 seconds on each side of the mirror image point. If the data in the delay line is used only for the first half of any one cycle, it is seen that only 1024 bits are used—512 bits on each side of the image point. Since the time spacing between bits is 2 milliseconds, the effective integration time is now reduced to 1 second. The purpose of reducing the integration time is to decrease adverse effects of non-linearity of the Doppler cure.

Obviously many modifications and variations of the present invention are possible in the light of the above teachings. It is therefore to be understood that within the scope of the appended claims the invention may be practiced otherwise than as specifically described.

What is claimed is:

1. A correlation Doppler system for determining the time of intercept between a Doppler frequency of a radio frequency signal of a moving satellite and a fixed reference signal at a receiving position comprising:
   means for receiving the transmitted radio frequency signal from a moving satellite;
   means for mixing said received satellite signal with a fixed reference signal to produce a beat frequency signal between said signals because of the variation of the frequency of said satellite signal due to the Doppler effect caused by the motion of the satellite;
   delay means for combining various delayed signals of said beat frequency signal from the first half of said delay means with second half of said delay means;
   means for feeding said beat frequency signal from said mixing means to said delay means; and
   summing means for adding the combined delay signals of said delay means whereby a peak of said combined signals will indicate the time of intercept between the Doppler frequency signal and the fixed reference signal at a receiving position.

2. A correlation Doppler system for determining the time of intercept between a Doppler frequency of a radio frequency signal of a moving satellite and a fixed reference signal at a receiving position comprising:
   means for receiving the transmitted radio frequency signal from a moving satellite;
   means for mixing said received satellite signal with a fixed reference signal to produce a beat frequency signal between said signal because of the variation of the frequency of said satellite signal due to the Doppler effect caused by the motion of the satellite;
   delay line means having taps for combining various delayed signals of said beat frequency signal from the first half of said delay line means with second half of said delay line means;
   means for feeding said beat frequency signal from said mixing means to said delay line means; and
   summing means for adding the combined signals at said taps of said delay line means whereby a peak of said combined signals will indicate the time of intercept between the Doppler frequency signal and the fixed reference signal at a receiving position.

3. A correlation Doppler system of claim 2 wherein said means feeding said beat frequency signal to said delay line means comprises:
   a low pass filter means for limiting the band width of said beat frequency signal being fed to said delay line means.

4. A correlation Doppler system for determining a time of approach between a moving object and an observer location comprising:
   means for receiving a radio frequency signal from a moving object;
   means for mixing said received satellite signal with a fixed reference signal at the observer location to produce a beat frequency signal between said satellite received signal and said fixed reference signal;
   low pass filter means connected to said mixing means for limiting the bandwidth of said beat frequency signal;

hard limiter means connected to said filter means for receiving said output of said low pass filter means for making a digital signal out of said beat frequency signal from said low pass filter means;

digital computer means connected to said hard limiter means for sampling and arranging sequentially sampled digital bits from said digital signal whereby in any one sample cycle of said computer the polarity of the older sequentially sampled digital bits are compared and correlated in time symmetry with the polarity of the newer sequentially sampled digital bits and for determining a time of approach between a moving object and an observer location.

5. A correlation Doppler system of claim 4 wherein said digital computer means comprises:

means for comparing in time mirror symmetry the like polarity between the older and newer sequentially sampled bits in any one sample cycle;

means for counting the like polarity between said compared sampled bits;

means for intergrating the like polarity counts for any one sample cycle whereby the greatest number of polarity counts indicates a predetermined time from a time of approach between a moving object and an observer location.

6. A correlation Doppler system of claim 4 wherein said digital computer means comprises:

delay line means for receiving sequentially sampled bits;

gate generator means for initiating various gates at appropriate times for selectively applying the digital bits to said delay line means whereby every other digital bit will have its time symmetrical mirror image bit immediately following it in position in said delay line means;

comparison means for comparing the polarity of said mirror image bits in said delay line means; and integrating means for determining the maximum number of like polarity mirror image bits for any one sample cycle of said delay line means.

7. A digital computer for a correlation Doppler system comprising:

delay line means;

means for sampling bits of a digital signal at a predetermined reoccurring period of time;

means for accepting sequentially various sampled digital bits for said delay line means, said delay line means connected to said accepting means;

bit delay means connected to said delay line means for delaying the output of said delay line means;

comparison means connected to said delay line means and said bit delay means for comparing the like polarity between the older and newer sampled bits at the output of said delay line means and an output of said bit delay means;

counting means connected to said comparison means for selecting and counting from said compared older and newer sampled bits time symmetrical mirror image bits having like polarity;

means connected to said counting means for integrating the number of like polarity counts for said compared mirror image bits for each predetermined period of time;

feedback gate means connected to said accepting means, said delay line means, and said bit delay means;

gate generator means for initiating various gate signals at appropriate times and selectively applying said gate signals to said sampling means, feedback gate means, counting means and integrating means whereby said sampled digital bits are shifted and arranged in said delay line means with each newer bit respectively being followed by its time symmetrical mirror image older bit, and whereby the output of said integrating means indicates the time of the greatest number of like polarity counts for time symmetrical mirror image bits.

References Cited

UNITED STATES PATENTS

| | | | |
|---|---|---|---|
| 3,121,868 | 2/1964 | Hausz et al. | 343—5 |
| 3,195,136 | 7/1965 | Klein | 343—112 |
| 3,256,519 | 6/1966 | Dewey et al. | 343—12 |

RODNEY D. BENNETT, *Primary Examiner.*

R. E. BERGER, *Assistant Examiner.*